Oct. 21, 1930.  F. FRANZ  1,779,122
TESTING AND ADJUSTING DEVICE FOR THE BALANCE
WHEEL UNITS OF CLOCKS AND WATCHES
Filed Dec. 31, 1928  3 Sheets-Sheet 1
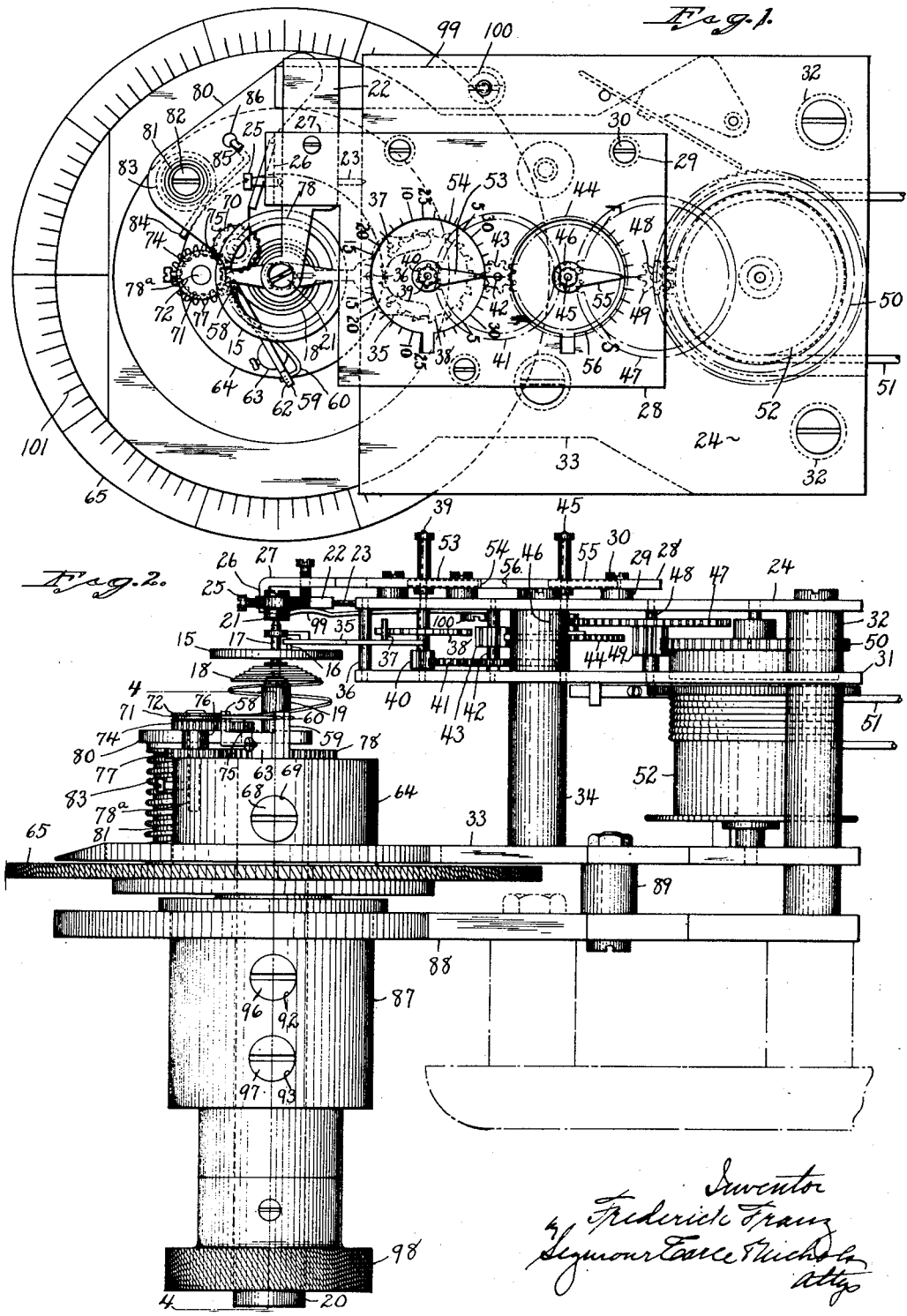
Inventor
Frederick Franz
by Seymour Earle & Nichols
attys

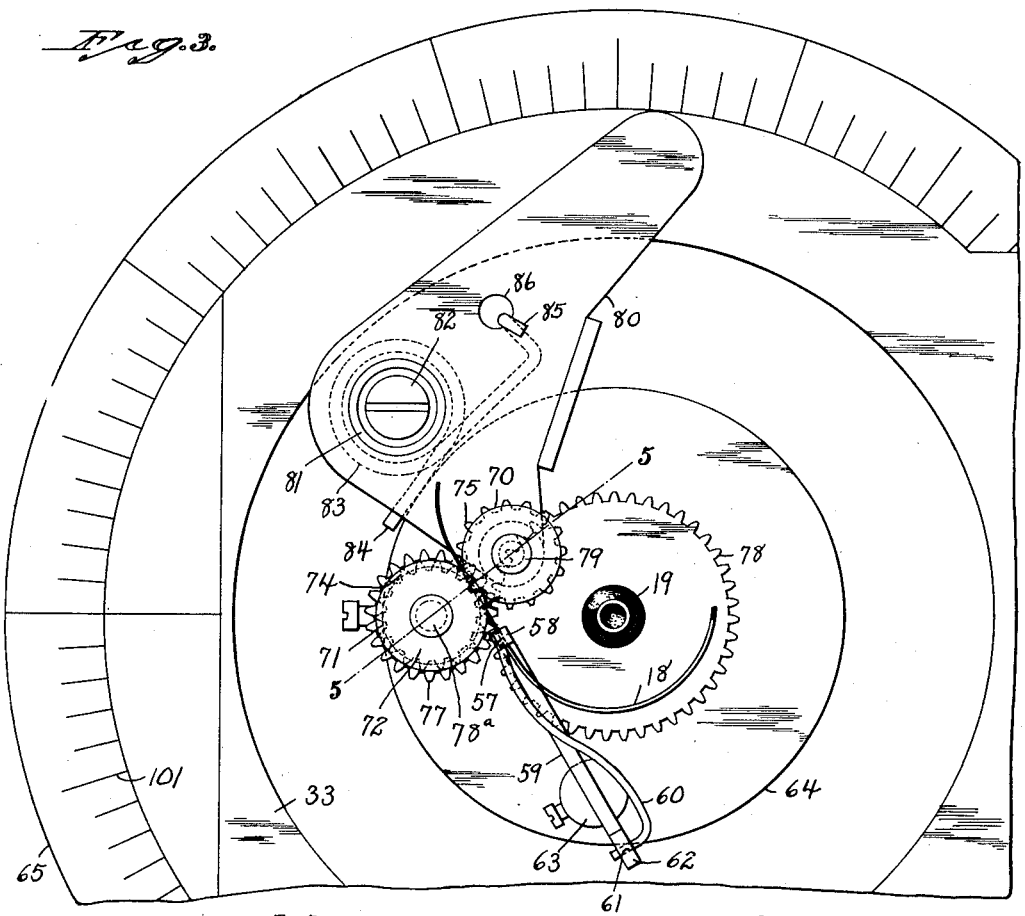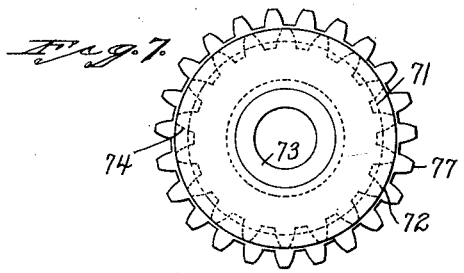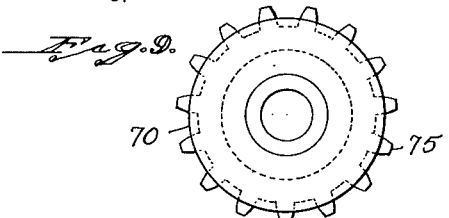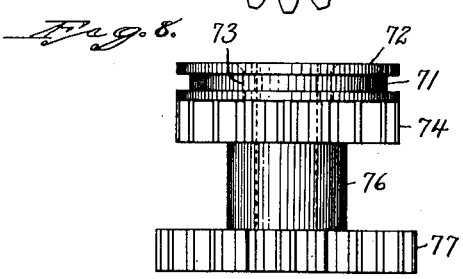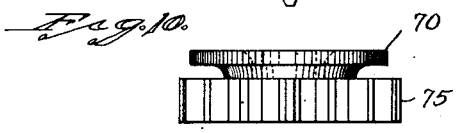

Oct. 21, 1930.  F. FRANZ  1,779,122
TESTING AND ADJUSTING DEVICE FOR THE BALANCE
WHEEL UNITS OF CLOCKS AND WATCHES
Filed Dec. 31, 1928    3 Sheets-Sheet 3

Inventor
Frederick Franz
by Seymour Pearce Nichols
Atty

Patented Oct. 21, 1930

1,779,122

UNITED STATES PATENT OFFICE

FREDERICK FRANZ, OF HAMDEN, CONNECTICUT, ASSIGNOR TO THE NEW HAVEN CLOCK CO., OF NEW HAVEN, CONNECTICUT, A CORPORATION

TESTING AND ADJUSTING DEVICE FOR THE BALANCE-WHEEL UNITS OF CLOCKS AND WATCHES

Application filed December 31, 1928. Serial No. 329,523.

This invention relates to devices for testing and adjusting the balance-wheel units of clocks and watches; the said balance-wheel unit comprising the usual balance-wheel proper and a spiral hair-spring coupled thereto.

The object of this invention is to produce a device for testing and adjusting the balance-wheel units of clocks and watches which will graphically indicate the degree of accuracy of a given balance-wheel unit after a trial-run and enable the operator to readily and quickly adjust the hair-spring of such a unit to correct or compensate for such inaccuracies as may be indicated as the result of such trial-run.

With the above object in view, my invention consists in a testing-and-adjusting device for the balance-wheel units of clocks and watches characterized by having a driving-train and an escapement for oscillating the balance-wheel unit to be tested and manually-operable adjusting-means adapted to grip the free end of the hair-spring of such a unit so as to vary the length of its free portion.

My invention further consists in a testing-and-adjusting device for the balance-wheel units of clocks and watches characterized as above and having certain details of construction and combinations of parts as will be hereinafter described and particularly recited in the claims.

In the accompanying drawings:

Fig. 1 is a top or plan view of a testing-and-adjusting device constructed in accordance with my invention and showing the hair-spring unit in place therein;

Fig. 2 is a view thereof in side elevation;

Fig. 3 is an enlarged-scale broken top or plan view of the hair-spring adjusting-portion of my improved device:

Fig. 7 is a detached top or plan view of the grooved hair-spring adjusting-roller, together with its two pinions;

Fig. 8 is a view thereof in side elevation;

Fig. 9 is a top or plan view of the complementary flanged rotary hair-spring adjusting-roller together with its pinion; and Fig. 10 is an edge view thereof.

Figure 4:
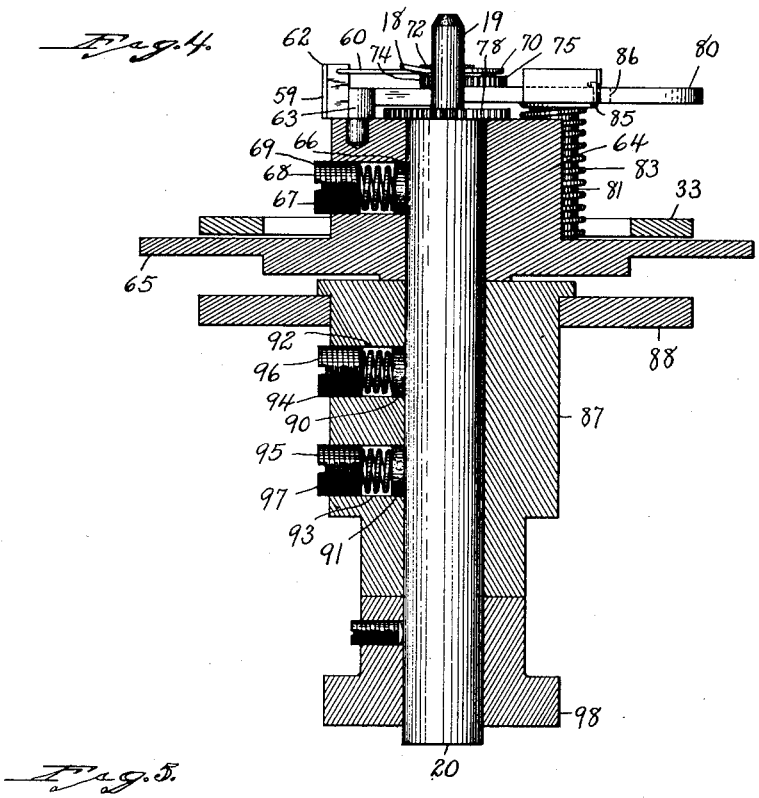
Fig. 4 is a vertical sectional view taken on the line 4—4 of Fig. 2.
Figure 5:
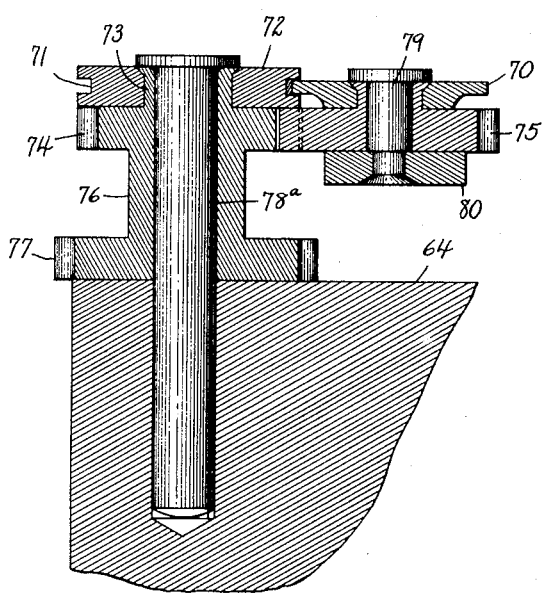
Fig. 5 is a broken detail sectional view taken on the line 5—5 of Fig. 3.

The testing-and-adjusting device about to be described is particularly adapted for use in connection with testing apparatus of the type shown in my co-pending application, Serial No. 292,704, filed July 14, 1928, in which it is illustrated, though not so limited.

The balance-wheel unit to be tested in my improved device consists of a balance-wheel proper 15 carrying an impulse-pin 16 and mounted upon a balance-wheel staff 17 pointed at its respective opposite ends and having secured to it one end of a spiral hair-spring 18 as indicated in Fig. 2 of the drawings. The lower end of the balance-wheel staff 17 bears in a conical recess formed in the upper end of a bearing-stud 19 upstanding from the upper end of a vertical shaft 20 to be hereinafter described.

The upper end of the staff 17 aforesaid bears in a conical recess formed in the lower face of a bearing-screw 21 mounted in the inner end of a rocking retaining-arm 22 which has projecting from one edge midway of its length a trunnion-pin 23 which bears in the front edge of a front movement-plate 24. Arranged in line with the said trunnion-pin 23 is a trunnion-screw 25 having a pointed inner end entering a shallow recess in the outer edge of the rocking-arm 22 aforesaid and threaded into the downwardly-turned end 26 of a finger 27 offsetting from the front edge of a dial-plate 28 which is spaced slightly above the front movement-plate 24 before referred to, by short pillars 29 to which it is secured by screws 30.

The rear movement-plate 31 is spaced from the front movement-plate 24 before referred to, so as to create a space for the accommodation of a driving-train, by pillars 32 and in turn is spaced above an index-plate 33 by pillars 34.

The balance-wheel unit comprising the balance-wheel proper 15, impulse-pin 16, staff 17 and hair-spring 18 is adapted to be oscillated in the same manner that it will be oscillated in a clock-movement in which it is to be installed, by an escape-lever 35 secured to a staff 36 mounted for oscillation at its respective opposite ends in the front and rear movement-plates 24 and 31.

The escape-pins 37 of the escape-lever 35 coact in the usual manner of time-trains with the teeth of an escape-wheel 38 mounted upon an escape-wheel arbor 39 carrying a pinion 40 meshed into and driven by the fourth wheel 41 of the driving-train, which wheel is carried by a fourth-wheel arbor 42 carrying a pinion 43 meshed into and driven by the third wheel 44 mounted upon the third-wheel arbor 45 which also carries a pinion 46. The pinion 46 just referred to is meshed into and driven by the second wheel 47 of the driving-train, which is carried by a second-wheel arbor 48 also mounting a pinion 49 meshed into and driven by the main-wheel 50 of the driving-train. The main-wheel 50 is driven by a weighted cord or cable 51 wrapped around a drum 52 in the usual manner of weight-driven clock-movements.

The escape-wheel arbor 39 of the driving-train is extended upward beyond the front movement-plate 24 and has frictionally mounted upon it a pointer 53 which is positioned in a circular opening 54 in the dial-plate 28 and is adapted to register with graduations around the edge of the said opening. The third-wheel arbor 45 of the driving-train is also extended upward beyond the front movement-plate 24 and has frictionally mounted upon it an indicating-pointer 55 positioned in a circular opening 56 in the dial-plate 28 and is adapted to register with graduations arranged upon the edge of the said opening 56.

As the various wheels of the driving-train rotate in effecting the oscillation of the balance-wheel unit, the pointers 53 and 55 also sweep around with respect to the graduations around the edge of the openings 54 and 56 in which they are respectively positioned, so that during a trial-run of the balance-wheel unit for a predetermined length of time the operator may, by observing the pointers 53 and 55, judge at the termination of such a trial-period whether or not the free portion of the hair-spring 18 is of the correct length to cause the balance-wheel unit to oscillate at a rate in accordance with a set standard. The relative speeds of the pointers 53 and 55 are such that the pointer 55 moves the distance of one graduation for each complete revolution of the pointer 53.

Figure 6:
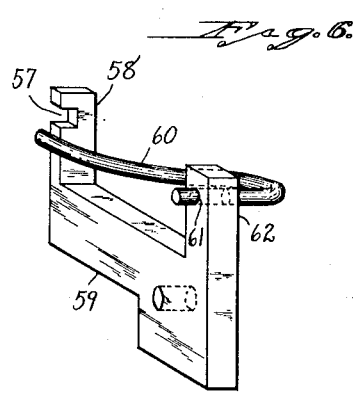
Fig. 6 is a detached perspective view of the hair-spring guide-fixture.

The free end of the hair-spring 18 is frictionally held in a guide-notch 57 formed in the upstanding arm 58 of a guide-fixture 59 (Fig. 6) by a bowed spring-arm 60 which has its opposite end positioned in a bore 61 in an upstanding arm 62 at the opposite end of the said fixture. The fixture 59 just described is mounted in a bifurcated stud 63 projecting upward from the upper face of a hub 64 forming part of a disk-like index-dial 65 which is frictionally coupled to the vertical adjusting-shaft 20 by a friction-plug 66 pressed against the same by a helical spring 67 abutting at its outer end against a screw-plug 68 threaded into a bore 69 in the said hub, which bore also houses the said plug 66 and the said spring 67.

The free end of the hair-spring 18 extending beyond the notch 57 in the guide-fixture 59 is pinched between the periphery of an adjusting-roller 70 and the bottom of a groove 71 formed in a complementary adjusting-roller 72 which rollers act, as will hereinafter appear, to move the spring endwise one way or the other through the notch 57 to shorten or lengthen its coils and hence vary its rate of oscillation and the oscillation-rate of the entire unit.

The adjusting-roller 72 just above referred to is secured to the upstanding sleeve 73 of a pinion 74 which meshes with a pinion 75 to which the adjusting-roller 70 is secured, so that both of the said rollers 70 and 72 are driven at a corresponding peripheral speed. The pinion 74 is connected by an integral tubular shank 76 with a pinion 77 which meshes into a gear-wheel 78 staked upon the inner end of the bearing-stud 19 forming an extension of adjusting-shaft 20. The pinions 74 and 77 united by their integral shank 76 are adapted to rotate together with the adjusting-roller 72 upon a stud 78$^a$ upstanding from the upper face of the hub 64 of the index-dial 65.

The pinion 75 and the adjusting-roller 70 carried thereby are adapted to rotate upon a vertical stud 79 mounted in one end of an L-shaped lever 80 which has secured to it a depending sleeve 81 oscillating upon a screw-stud 82 upstanding from the index-dial 65. For the purpose of urging the lever 80 in a clockwise direction so as to hold the adjusting-roller 70 against one face of the free end of the hair-spring 18 so as to pinch the same against the bottom of the groove 71, I provide a helical torsion-spring 83 encircling the sleeve 81 and having one of its arms 84 bearing against the periphery of the hub 64 and its other arm 85 hooped through an opening 86 in the said lever.

The vertical adjusting-shaft 20 is adapted to be rotated in a bearing-boss 87 depending from a bracket-plate 88 arranged parallel with and slightly below the index-plate 33 to which it is secured by pillars 89. To frictionally restrain the rotation of the adjusting-shaft 20 within the boss 87 I provide two friction-plugs 90 and 91 which are located in radial bores 92 and 93 in the boss 87 and are forced against the said shaft by helical springs 94 and 95 impinging at their outer ends against adjusting-screws 96 and 97. The lower end of the said shaft 20 has secured to it a knurled finger-button 98 by means of which it may be rotated against the frictional restraint of the plugs 90 and 91 as will hereinafter appear.

In the use of my improved testing-and-adjusting devices for the balance-wheel units of clocks and watches, a balance-wheel unit to be tested is inserted in such position as to have the lower end of its staff 17 seated in the conical cavity in the upper end of the bearing-stud 19 and the upper end of the said staff bearing in the conical cavity in the lower face of the bearing-screw 21 carried by the retaining-arm 22. This installation may be effected by pressing down upon the outer end of the said arm against the tension of a flat spring 99 which is secured by means of a screw 100 to the underface of the front movement-plate 24. The depression of the outer end of the said retaining-arm causes it to rock in the vertical plane and lift the bearing-screw 21 at its inner end, so as to permit the insertion of the said unit as before described.

With the balance-wheel unit in place, the free end of its hair-spring 18 is positioned in the guide-notch 57 of the guide-fixture 59 and retained in place therein by the spring-arm 60 which is swung up over it so as to hold it in the said notch. That portion of the free end of the hair-spring projecting beyond the notch 57 is now inserted in the groove 71 of the adjusting-roller 72 which is accomplished by swinging the lever 80 counter-clockwise so as to clear the adjusting-roller 70 from the said groove. After the end of the hair-spring is in place in the groove 71 the lever 80 is released and the spring 83 will act to cause the adjusting-roller 70 to force the hair-spring into the said groove and firmly grip it therein.

In order to test the balance-wheel unit it is necessary that its impulse-pin 16 be brought into alignment with the forked outer end of the escape-lever 35. This is accomplished by turning the adjusting-shaft 20 by means of its finger-button 98 so as to turn the index-dial 65 and all of the parts carried thereby and by its hub 64, including the rollers 70 and 72 and the guide-fixture 59. The turning of the parts as just described will also turn the balance-wheel unit as a whole.

The balance-wheel unit is now ready for a trial-run of predetermined duration which is inaugurated by starting the driving-train which will oscillate the balance-wheel unit in the same manner that it will be oscillated in the time-piece for which it is intended. As the balance-wheel unit is oscillated as just described the pointers 53 and 55 will move with respect to the graduations marked upon the edges of the openings 54 and 56 in which they are located.

Now at the termination of the predetermined test-period and by any approved means the oscillations of the balance-wheel unit are stopped and the operator observes the position of the pointers 53 and 55. If these pointers indicate a predetermined correct reading, that portion of the hair-spring of the balance-wheel unit extending between the arm 58 of the guide-fixture 59 and the staff of the unit may be considered of the correct length to function properly in a time-movement. The operator, therefore, kinks or otherwise marks the hair-spring adjacent the place where it emerges from the guide-notch 57 and the unit is removed for installation in a time-movement.

If, however, at the end of the predetermined test-period the pointers 53 and 55 indicate that the oscillations of the said unit are too rapid or fast, the operator will rotate the index-dial 65 clockwise by means of its knurled periphery a distance corresponding in the number of graduations 101 upon its upper face to the excess number of beats indicated by the pointers 53 and 55.

The rotation of the index-dial, together with the parts carried thereby, as just above described (the adjusting-shaft 20 at this time being held stationary by the friction-plugs 90 and 91), causes the adjusting-rollers 70 and 72 to force the hair-spring through the guide-notch 57 so as to increase the length of its free portion between the guide-arm 58 and the balance-wheel staff 17, the said arm meanwhile traveling bodily with the said rollers, which latter also rotate. The rotation of the said rollers is effected by the meshing of the pinion 77 with the gear-wheel 78 held stationary during this operation by the friction-plugs 90 and 91.

The hair-spring having been adjusted as just above described, it may be now marked or kinked and removed for installation in a time-piece, or, if preferred, it may be given another trial-run to re-check its adjustment.

The gear-wheels 78, pinions 74, 75, 77, the diameter of the groove 71 in the adjusting-roller 72 and the extreme diameter of the adjusting-roller 72 are carefully predetermined in size so that when the index-dial is rotated to rotate the said feed-rolls and move the hair-spring endwise through the guide-notch 56, the balance-wheel unit will not be turned appreciably, so that the alignment of its impulse-pin 37 with respect to the escape-lever 35 will not be appreciably altered.

Should the balance-wheel unit being tested oscillate too slowly during its trial-run, the movement of the index-dial in a counter-clockwise direction will draw the hair-spring through the guide-notch 57 so as to shorten its length between the arm 58 and the balance-wheel staff 17.

I claim:

1. A testing-and-adjusting device for the balance-wheel units of clocks and watches comprising means for releasably mounting a balance-wheel unit to be tested; a driving-train including an escapement for oscillating the said unit; an indicator actuated by the said train for indicating the oscillations of the said unit; manually-operable adjusting-means engageable with the free end of the hair-spring of the said unit for altering the length of the free portion thereof; and means for indicating the degree of such alteration.

2. A testing-and-adjusting device for the balance-wheel units of clocks and watches comprising means for releasably mounting a balance-wheel unit to be tested; a driving-train including an escapement for oscillating the said unit; a pair of differentially-speeded indicators driven by the said train for indicating the oscillations of the said unit; manually-operable adjusting-means engageable with the free end of the hair-spring of the said unit for altering the length of the free portion thereof; and means for indicating the degree of such alteration.

3. A testing-and-adjusting device for the balance-wheel units of clocks and watches comprising means for releasably mounting a balance-wheel unit to be tested; a driving-train including an escapement for oscillating the said unit; an indicator driven by said train to indicate the oscillation of the said unit; a guide-fixture for the hair-spring of the said unit; a pair of adjusting-rollers adapted to receive the free end of the said hair-spring between them; means for rotating the said rollers to move the said hair-spring endwise with respect to the said guide-fixture; and indicating-means movable coincidentally with the said rollers to indicate the degree of movement thereof.

4. A testing-and-adjusting device for the balance-wheel units of clocks and watches comprising means for releasably mounting a balance-wheel unit to be tested; a driving-train including an escapement for oscillating the said unit; an indicator actuated by the said train for indicating the oscillations of the said unit; a guide-fixture for the hair-spring of the said unit; a pair of adjusting-rollers adapted to receive the free end of the said hair-spring between them; means for rotating the said rollers to move the said hair-spring endwise with respect to the said fixture; and calibrated index-means for measuring the movement of the said rollers.

5. A testing-and-adjusting device for the balance-wheel units of clocks and watches comprising means for releasably mounting a balance-wheel unit to be tested; a driving-train including an escapement for oscillating the said unit; manually-operable adjusting-means engagable with the free end of the hair-spring of the said unit for altering the length of the free portion thereof including a two-part rotary fixture, one part of which frictionally coupled to the other part with capacity for independent rotation.

6. A testing-and-adjusting device for the balance-wheel units of clocks and watches comprising means for releasably mounting a balance-wheel unit to be tested; a driving-train including an escapement for oscillating the said unit; an indicator driven by the said train for indicating the oscillation of the said unit; a guide-fixture for the hair-spring of the said unit; a pair of adjusting-rollers adapted to receive the free end of the said hair-spring between them, one of the said rollers being mounted upon a spring-pressed arm for movement into a releasing position; means for rotating the said rollers for moving the said hair-spring endwise with respect to the said guide-fixture; and indicating-means movable coincidentally with the said rollers to indicate the degree of movement thereof.

7. A testing-and-adjusting device for the balance-wheel units of clocks and watches comprising means for releasably mounting a balance-wheel unit to be tested; a driving-train including an escapement for oscillating the said unit; a guide-fixture for the hair-spring of the said unit; a hair-spring adjusting-fixture; a pair of adjusting-rollers mounted upon the said adjusting-fixture with capacity for concurrent bodily and rotary movement and adapted to receive the free end of the said hair-spring between them.

8. A testing-and-adjusting device for the balance-wheel units of clocks and watches comprising means for releasably mounting a balance-wheel unit to be tested; a driving-train including an escapement for oscillating the said unit; a rotary adjusting-member for the hair-spring of the said unit; a hair-spring guide-fixture carried by the said adjusting-fixture; a pair of adjusting-rollers also carried by the said adjusting-fixture and adapted to receive the free end of the said hair-spring between them; a pinion secured to one of the said rollers; a gear-wheel meshing with the said pinion and normally stationary with respect to the said rotary adjusting-member; whereby the rotation of the said rotary adjusting-member will effect the bodily and rotary movement of the said adjusting-rollers to move the said hair-spring endwise with respect to the said guide-fixture.

9. A testing-and-adjusting device for the balance-wheel units of clocks and watches comprising means for releasably mounting a balance-wheel unit to be tested; a driving-train including an escapement for oscillating the said unit; a rotary adjusting-member for the hair-spring of the said unit; a hair-spring guide-fixture carried by the said adjusting-fixture; a pair of adjusting-rollers also carried by the said adjusting-fixture and adapted to receive the free end of the said hair-spring between them; a pair of intermeshing pinions respectively secured to the said rollers; a second pinion also secured to one of the said rollers; a gear-wheel meshing with the said second pinion and normally stationary with respect to the said rotary adjusting-member; whereby the rotation of the said rotary adjusting-member will effect the bodily and rotary movement of the said adjusting-rollers to move the said hair-spring endwise with respect to the said guide-fixture.

10. A testing-and-adjusting device for the balance-wheel units of clocks and watches comprising means for releasably mounting a balance-wheel unit to be tested; a driving-train including an escapement for oscillating the said unit; a rotary adjusting-member mounted in a support; friction-means for resisting the movement of the said adjusting-member; a second adjusting-member rotatably mounted upon the first-mentioned adjusting-member; friction-means of less capacity than the first-mentioned friction-means for yieldingly coupling the two adjusting-members together; a guide-fixture for the hair-spring of the said unit carried by the said second adjusting-member; a pair of adjusting-rollers also carried by the said second adjusting-member and adapted to receive the free end of the said hair-spring between them; a pinion carried by one of the said rollers; and a gear-wheel carried by the first-mentioned adjusting-member and meshing into the said pinions.

In testimony whereof, I have signed this specification.

FREDERICK FRANZ.